April 20, 1965  G. FALBEL  3,179,105
OFF-AXIS FOCUSED SOLAR HEATER
Filed Sept. 19, 1963

INVENTOR.
GERALD FALBEL
BY
ATTORNEY

United States Patent Office 3,179,105
Patented Apr. 20, 1965

3,179,105
OFF-AXIS FOCUSED SOLAR HEATER
Gerald Falbel, 59 Glen Ave., Stamford, Conn.
Filed Sept. 19, 1963, Ser. No. 310,063
8 Claims. (Cl. 126—271)

This invention relates to an off axis solar heating system and more particularly to such a system associated with a house to be heated by solar energy.

In the past solar energy has been used extensively for heating but in general this has been done in two ways. In the case of a solar heated house the roof or walls or both are provided with a heating medium which may be water or some other liquid. The sun's rays striking the surfaces heat up the medium which can be pumped to a heat sink, for example a chamber with a large mass of material such as rocks so that the heat can be stored. This is of course of importance because, except in unusual climates for example southwest United States, there are periods during which the sun does not shine for a day or two at a time and so it is necessary to accumulate heat in a heat sink. The heat is then used when needed for heating the house by pumping the same or a different medium in heat exchanging relation with the heat sink and with the interior portions of the house. Solar heated houses, although they have been practical in locations such as the southwest United States where the duration of cloud cover rarely exceeds a day, have not proven to be satisfactory in climates for example, the northeastern United States, where it is not unusual for the sun to be obscured by clouds for a number of days in succession and even occasionally for a week. It is true that in such cases a relatively small auxiliary system may be used and the solar heating utilized for a major portion of the heat during the heating season. But there is still insufficient heating area for climates that do not have many hours of intense sunshine and so solar heating of buildings has been seriously limited in its practical utilization.

Other types of solar heating have been proposed and in smaller units have been practically used. These involve focusing mirrors. When an accurate focusing mirror is used and is aimed directly at the sun it is possible to achieve extraordinarily high temperatures and this has been utilized for the melting or otherwise heat processing of highly refractory materials. A somewhat similar use has been for heating at lower temperatures by means of cylindrical mirrors or troughs which have been employed for stream generation and similar power purposes.

The on axis focusing of solar heat requires some means for turning the mirror so it is pointed at the sun throughout the period of time when the sun is shining. In the case of heating of buildings this requires quite elaborate mechanical drives which add to expense and present maintenance problems. A second disadvantage of the on axis or focused solar heating is the relatively higher temperatures which are reached. Even if the area of the heat absorbing surfaces are comparatively large, temperatures are produced which are too hot for many media although they can be used for relatively high temperature steam for power generation. The temperature factor is perhaps less serious than the great complication required in the drive for large mirrors which must be continuously pointed at the sun.

The on axis focused solar heating has constantly striven for accurate focusing. This is one reason why the mirror has to be continuously driven to point at the sun. For maximum efficiency of course accurate focusing has many advantages but the disadvantages of the cumbersome drive and high temperature at the focus have rendered this method of heating buildings economically undesirable and there has been no extended success in solar heated homes or other buildings utilizing on axis heating.

The present invention depends for its operation on a deliberate departure from the conditions which were considered necessary for focused solar heating. It is based on the use of an off axis focusing mirror which need not be perfect in its surface contour and reflects, focusing with a low degree of resolution, onto a fairly large surface of the heat collector such as a tank for water or other heat absorbing means. It is deliberately intended to utilize the resulting aberrations which destroy the resolution at the focus because now the heat is not focused sharply in a small area but is distributed over a larger area because of the large circles of confusion introduced by the aberrations inherent in off axis operation. These aberrations and the lack of sharp imaging are deliberately used in order to produce a better system for solar heating, particularly of homes.

By means of the present invention an off axis mirror can be erected over the top of the house, for example, it may be a thin aluminum, or coated steel sheet supported by pylons. The aluminum sheet may constitute part or all of the roof which can effect building economies. The resulting catenary curves of the edges produce rough approximation of a paraboloid. No attempt is made for great precision. The reservoir of liquid medium acting as an exchanger, for example in the form of a shallow tank or flat black plate with attached pipes, is mounted on a tower which is higher than the building and of course higher than the off axis mirror. This tower is located opposite the sun, for example in the case of the northern hemisphere to the north of the building. When the building faces north, a tower structure may be utilized to form part of an entrance structure for the building.

For a period of several hours around local apparent noon, the sun's radiations striking the off axis focusing mirror are imaged, if one may call the extremely rough resolution produced an image, onto the heat absorbing reservoir. If the mirror is a paraboloid there will be produced a comparatively large circle of very poorly focused radiation. This circle will not produce temperatures that are too high for the transfer medium and therefore one of the extremely serious drawbacks of on axis solar heaters for home heating is avoided. At the same time with a reasonable size of heat exchanger the roughly focused radiation will remain on the heat exchanger for a considerable period of time either side of local apparent noon. It should be remembered that accurate focusing with low aberration produces high temperatures but adds nothing to the heat because the same amount of heat from the sun is distributed over the larger circle when the highly aberrant off axis system of the present invention is employed. Thus there is nothing lost in efficiency and there is achieved the great gain of completely stationary mirrors with no driving means and with no danger of excessive temperature on the absorbing vessel. At the same time the light supported mirror presents no maintenance problems which are encountered with moving drives. In the preferred embodiment where the mirror forms part or all of the roof structure proper there is involved but little or, in some case no additional investment.

The mirror extends normally beyond the walls of the house and makes gutters unnecessary. It is of course necessary to provide a drain pipe in the center so that water which collects will be allowed to flow off. This however presents no serious construction problem and in the case of many architectural styles for modern houses can be combined with a small central court.

While the present invention is not limited to the use of a particular type of heat sink, two types of heat sinks which can be directly applied will be discussed here. In the first of these a covered swimming pool is used with water as the heat storing medium. On an economical basis, a covered swimming pool, is an ideal sink for the following reasons:

(1) A swimming pool has a large water capacity and can thus provide a desirable long term heat sink.

(2) Swimming pools are usually made of concrete which is a good insulator.

(3) Since the water is kept in the pool all year round, the cost of emptying and refilling the pool in the spring and fall is saved.

(4) The use of an insulated removable cover on the pool is highly desirable from a safety standpoint where there are small children in the household.

(5) Since the swimming pool provides family recreation, its cost does not constitute a cost chargeable entirely to the present invention.

In addition, since the swimming pool may be opened, which is not the case with a normally used buried water tank, aluminum barrels of paraffin may be inserted into the pool in the winter to greatly increase its heat storage capacity as a heat sink. The function of this paraffin as a medium to increase the sink's heat capacity is discussed as a part of the description of the second type of heat sink which follows.

The water is heated by circulating liquid from the heat exchanger through suitable pipes.

The second type of heat sink which can be used with this invention, consists of a thick concrete slab below the house. This concrete slab of course contains embedded pipes which circulate the heating medium from the heat exchanger and it is possible to utilize a very simple change of phase heat storing means which is not practical with ordinary solar heating. High molecular hydrocarbons such as paraffin wax melt at temperatures from 40 to 60 or 80° C. and have a very high latent heat of fusion, not too greatly less than that of water. Concrete is easily made with incorporation of large amounts of paraffin wax dispersed therein. The wax does not react with any constituents of the concrete or with pipes and it is stable and does not deteriorate over many years of use. Paraffin or similar compounds which store heat by change of phase could not be used in the ordinary solar heated house because the rays striking a surface frequently did not produce sufficiently high temperature to melt the paraffin. While the present invention does not produce the enormous temperatures of an axis focused solar heating, the temperature is considerably higher than is produced by the unfocused sun's rays on an ordinary flat surface and is amply high to impart to the circulating liquid absorbing medium in the heat exchanger a temperature sufficient to melt paraffin. The aluminum barrels full of paraffin referred to above perform the same function of increasing the heat storage capacity of the swimming pool.

Solar heating is only needed in the winter. In the summer it is not only not needed but is undesirable. Therefore considerable problems are presented in the ordinary solar heated house because the relatively large amounts of heat transfer medium are heated up by hot sun on long summer days and remain hot during the night, thus presenting either uncomfortable temperatures or extra load on an air conditioning system if such is employed. The present invention solves this problem and at the same time makes an improved house for summer. During the summer months the sun's altitude is so high near local apparent noon that the focused image misses the heat absorbing reservoir on the tower altogether. In other words, the heating is automatically shut off. At the same time the aluminum mirror reflects the sun's rays and keeps the house much cooler than an ordinary house. Thus the same element performs two entirely different functions at different times in the year which is an important added advantage of the present invention when used for the solar heating of homes.

The invention will be described in greater detail in conjunction with the drawings in which.

Figures 1, 2:
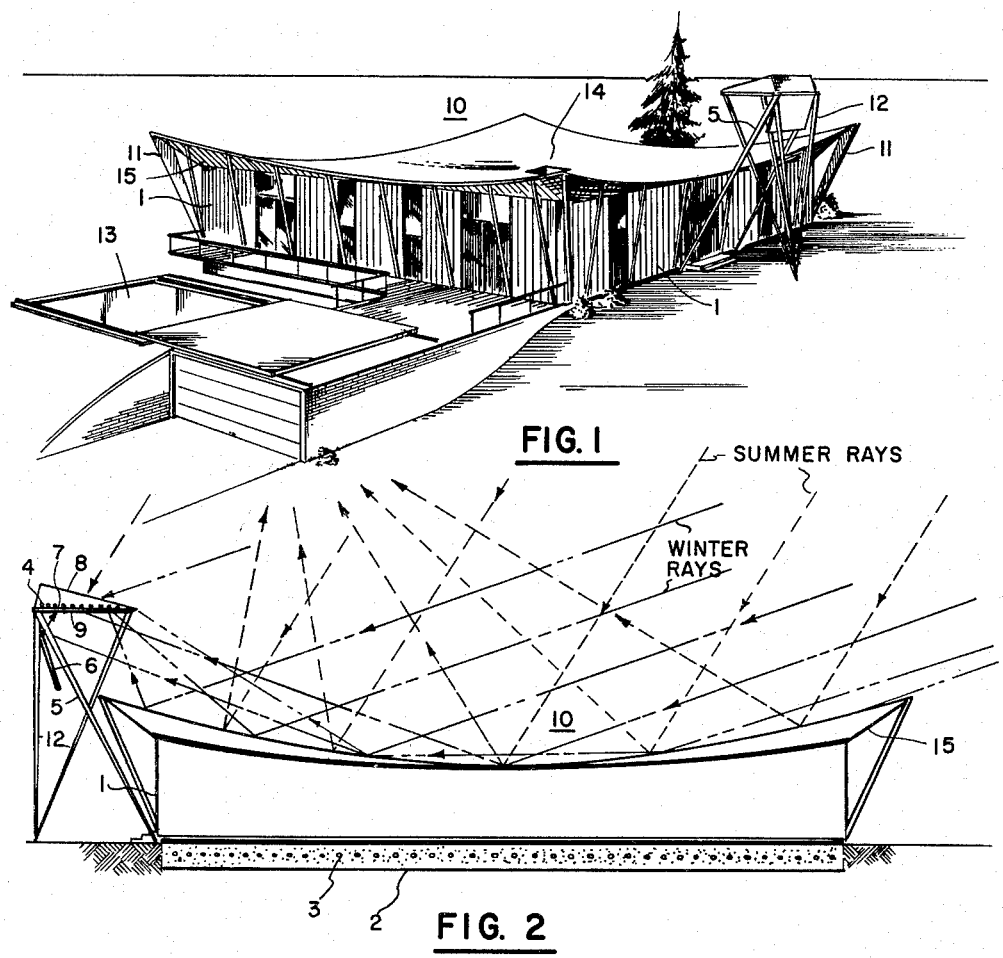
FIG. 1 is an isometric view of a house utilizing the invention.
FIG. 2 is a simplified section through the center of the same house.

The wall of the house is shown at 1 the same reference numeral being used for the west wall of FIG. 1 and the north wall of FIG. 2. In fact in the two figures the same functional elements all bear the same reference numerals. The house is provided with a thick concrete slab heat sink 2 with embedded heating pipes 3. The concrete also contains dispersed therein a relatively large amount of paraffin which of course cannot be shown on the drawing.

Over the ceiling of the house, and preferably spaced therefrom, is an aluminum mirror shown generally at 10. This is a moderately thin sheet of aluminum which is supported by four pylons 11. Each edge of the mirror hangs as a catenary and is normally reenforced with wire or light cable (not shown). The four catenaries cause the mirror as a whole, to assume the approximate form of a paraboloid.

On the north side of the house is a tower formed of four columns 12 and two pipes 5. At the top there is supported a blackened plate 7 of considerable area to which is attached a grid of pipes 4 which connect to the pipes 5. Transparent or translucent upper and lower surfaces 8 and 9 respectively are situated on either side of the plate 7. These surfaces transmit short wave radiation but do not transmit long wave infrared and produce a "greenhouse" effect on the plate 7 with its pipes 4. A hinged double faced mirror 6 is mounted adjacent an edge of the plate 7. When swung down it serves to reflect some additional radiation from the mirror and when swung up cuts off radiation to the plate 7. This latter function sometimes of importance on hot days in the late fall and early spring.

The liquid medium which is circulated through the pipes 4 may have any suitable composition which will resist freezing at the temperatures encountered. It can be a hydrocarbon or water with suitable antifreeze additives. The liquid, is circulated by conventional circulating pumps (not shown), through pipes in heat exchanging relation with the water in a swimming pool 13 which is shown in FIG. 1 and/or through heating pipes 3 in a concrete heat slab 2 as is shown in FIG. 2.

The location and height of the heat exchanger 7 is chosen with respect to the curvature of the mirror 10 so that during the winter months near local apparent noon the sun's rays will be focused at points on the lower surface 9 of the heat exchanger. The circle moves across the surface from west to east as the sun passes from the easterly meridional angle in the morning to a westernly meridional angle in the afternoon. As the sun's declination changes throughout the heating season the circle of the roughly focused image moves across the plate 7 from north to south. This is taken into consideration in constructing the mirror and the heat exchanger which should have the proper distance and the mirror the proper curvature for the latitude of the building which is to be heated. The drawings do not show dimensions accurately to scale but approximate the general dimensions and curvature useful in the latitude of northern New England.

FIG. 2, on which it has been stated before similar elements bear the same reference numerals, is a section in diagrammatic form and shows rays for winter and summer. It also illustrates the concrete slab heat sink modification.

Rain accumulating in the mirror 10 flows off at the center of the building through an opening 14 above a small courtyard. The sides of the mirror act as overhangs making it unnecessary to provide gutters thus performing automatically an additional useful function. It is, however, necessary to keep driven rain from striking the ceiling of the house. This is effected by the tilted soffit 15. In a fairly large house, such as shown, it is desirable not only to provide cables along the edges of the mirror but to provide two transverse diagonal supports from pylon to pylon. As the nature of these supports involves conventional building design and they are not a necessary functional part of the present invention they are not shown on the drawings.

The invention has been illustrated in conjunction with a solar heated home. This is the most important single field of utility for the invention but it should be realized that the off axis solar heating can be applied quite generally and does not need to be used for heating of a dwelling or for that matter for the heating of a building at all. While therefore in a more specific aspect the present invention is directed to solar heating of homes in a broader aspect it is not so limited and this use is merely a typical illustration.

While the relative positions of the mirror and heat exchanger must be maintained for the particular latitude in which the invention is to be used, it is not necessary that the mirror be exactly centrically located over the roof of a house. Nor is it necessary that the house be approximately square. There is an advantage where terrain and other constructional considerations permit in having the mirror more or less centered over the roof of the house because it then provides overhangs and heat insulation in the summer. But of course as far as the operation of the present invention is concerned the location of the mirror with respect to the building may be varied.

I claim:

1. An off axis focused solar heating system comprising in combination,
   (a) a fixed, substantially horizontal focusing mirror having a vertical axis and the mirror surface being substantially symmetrically distributed with respect thereto,
   (b) a heat exchanger for heat transfer fluid having substantial lateral extent and located above the mirror and displaced laterally from the axis of the mirror in a direction opposite to the sun's azimuth at local apparent noon, the location and height of said heat exchanger being such that solar radiation is roughly focused to form an image of extremely low resolution on the lower surface of the heat exchanger in the form of an extended image of the entrance aperture of the system, the resolution being sufficiently low so that unit areas of the heat exchanger do not acquire a temperature substantially in excess of the boiling point of water, and
   (c) means for circulating a liquid heat transfer medium through the heat exchanger.

2. A system according to claim 1 provided with a heat sink incorporating dispersed high molecular hydrocarbon change-of-phase material and means for circulating the heat transfer medium through said heat sink.

3. A solar heated house comprising a house and a heating system therefor according to claim 2 the focusing mirror being above the house and extending beyond the house walls.

4. A solar heated house according to claim 3 in which the mirror is centered over the house and is separated therefrom by an air space.

5. A solar heated house according to claim 4 in which the mirror is a suspended thin sheet of aluminum.

6. A solar heated house comprising a house and a heating system therefor according to claim 1 the focusing mirror being above the house and extending beyond the house walls.

7. A solar heated house according to claim 6 in which the mirror is centered over the house and is separated therefrom by an air space.

8. A solar heated house according to claim 7 in which the mirror is a suspended thin sheet of aluminum.

References Cited by the Examiner

UNITED STATES PATENTS

| | | | |
|---|---|---|---|
| 811,274 | 1/06 | Carter | 126—271 |
| 2,396,338 | 3/46 | Newton | 237—1 |
| 2,584,573 | 2/52 | Gay | 237—1 |
| 2,625,930 | 1/53 | Harris | 126—270 |
| 2,998,006 | 8/61 | Johnston | 126—271 |
| 3,001,331 | 9/61 | Brunton | 126—270 X |
| 3,072,920 | 1/63 | Yellott | 126—271 X |

OTHER REFERENCES

Thomason, Harry E.: Reflector Improves Solar House Heating. Reprint from Sun at Work, First Quarter, 1962.

JAMES W. WESTHAVER, *Primary Examiner.*